(12) United States Patent
Houchens et al.

(10) Patent No.: US 11,047,360 B1
(45) Date of Patent: Jun. 29, 2021

(54) METHODS, SYSTEMS, AND DEVICES TO OPTIMIZE A FLUID HARVESTER

(71) Applicants: National Technology & Engineering Solutions of Sandia, LLC, Albuquerque, NM (US); Carsten Westergaard, Houston, TX (US)

(72) Inventors: Brent C. Houchens, Oakland, CA (US); Myra L. Blaylock, Livermore, CA (US); David Vaughn Marian, Stockton, CA (US); David Charles Maniaci, Albuquerque, NM (US); Carsten Westergaard, Houston, TX (US)

(73) Assignees: National Technology & Engineering Solutions of Sandia, LLC, Albuquerque, NM (US); Carsten Westergaard, Houston, TX (US)

( * ) Notice: Subject to any disclaimer, the term of this patent is extended or adjusted under 35 U.S.C. 154(b) by 312 days.

(21) Appl. No.: 16/182,488

(22) Filed: Nov. 6, 2018

Related U.S. Application Data

(60) Provisional application No. 62/582,482, filed on Nov. 7, 2017.

(51) Int. Cl.
*F03D 3/04* (2006.01)
*F03B 11/02* (2006.01)
(Continued)

(52) U.S. Cl.
CPC .............. *F03D 3/0463* (2013.01); *F03B 3/04* (2013.01); *F03B 3/18* (2013.01); *F03B 11/02* (2013.01);
(Continued)

(58) Field of Classification Search
CPC .......... F03D 3/0463; F03D 9/25; F03D 3/002; F03D 3/005; F03D 1/04; F03B 3/04; F03B 3/18
See application file for complete search history.

(56) References Cited

U.S. PATENT DOCUMENTS 2,488,467 A 11/1949 Lisio
2,784,556 A 3/1957 Perdue
(Continued)

FOREIGN PATENT DOCUMENTS

JP S56167897 A 12/1981
JP S57206778 A 12/1982
(Continued)

*Primary Examiner* — David E Sosnowski
*Assistant Examiner* — Sabbir Hasan
(74) *Attorney, Agent, or Firm* — Medley, Behrens & Lewis, LLC

(57) ABSTRACT

An apparatus for energy extraction from fluid flow including an assembly including a plenum. The assembly further includes an aperture extending from an exterior surface to the plenum to allow flow therethrough. The apparatus further includes a channel including an inlet and an outlet in fluid communication with the plenum. The apparatus yet further includes an energy extraction device. The assembly is configured to create a pressure differential between the plenum and the inlet of the channel. The pressure differential causes fluid flow from the inlet of the channel to the plenum. The energy extraction device is configured to extract energy from the fluid flow. The apparatus additionally includes a control system configured to modify the pressure differential to control the fluid flow between the inlet of the channel and the plenum based on a characteristic of an exterior environment.

20 Claims, 16 Drawing Sheets

(51) Int. Cl.
   *F03D 9/28*    (2016.01)
   *F03D 9/25*    (2016.01)
   *F03D 3/00*    (2006.01)
   *F03B 3/04*    (2006.01)
   *F03B 3/18*    (2006.01)
   *F03D 9/45*    (2016.01)

(52) U.S. Cl.
   CPC ............ *F03D 3/002* (2013.01); *F03D 3/005* (2013.01); *F03D 9/25* (2016.05); *F03D 9/28* (2016.05); *F03D 9/45* (2016.05)

(56) References Cited

U.S. PATENT DOCUMENTS

| | | | |
|---|---|---|---|
| 5,709,419 A * | 1/1998 | Roskey | ............ F03D 13/20 290/55 |
| 7,132,758 B2 | 11/2006 | Rochester et al. | |
| 7,354,245 B2 | 4/2008 | Baba | |
| 9,249,810 B2 | 2/2016 | Gammack et al. | |
| 9,567,856 B2 | 2/2017 | Faller | |
| 2013/0099502 A1* | 4/2013 | Roberts | ............ F03B 17/06 290/54 |
| 2013/0139454 A1 | 6/2013 | Roudot et al. | |
| 2017/0298900 A1 | 10/2017 | Westergaard | |

FOREIGN PATENT DOCUMENTS

NL          1013205 C2    4/2001
WO    WO-2016054080 A1 *  4/2016    ............ F03D 1/04

\* cited by examiner

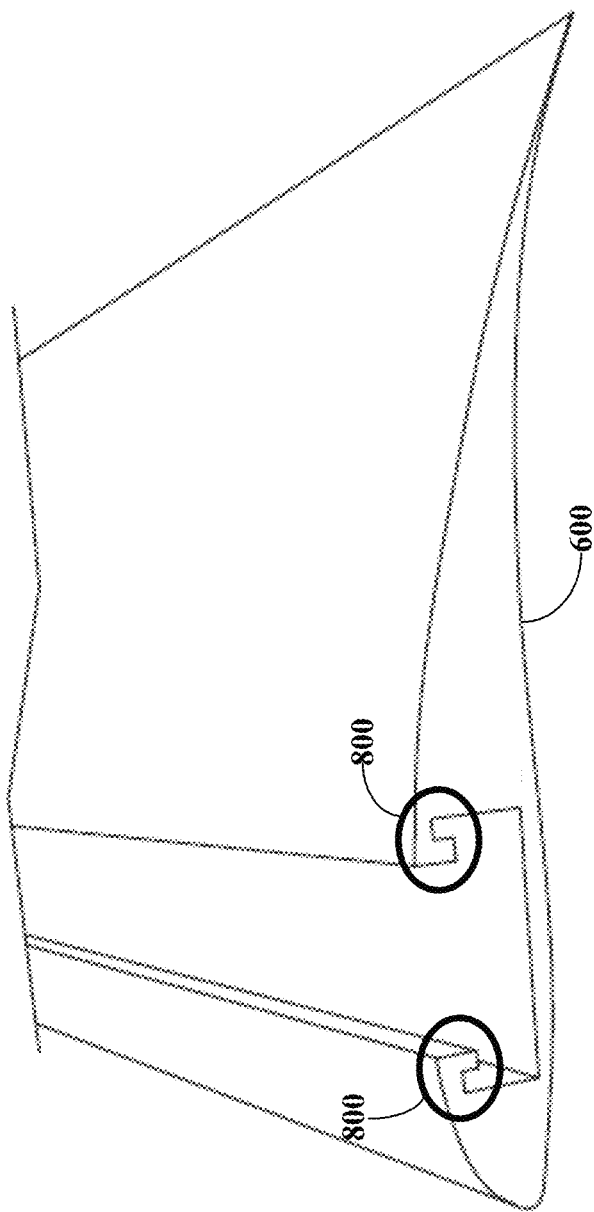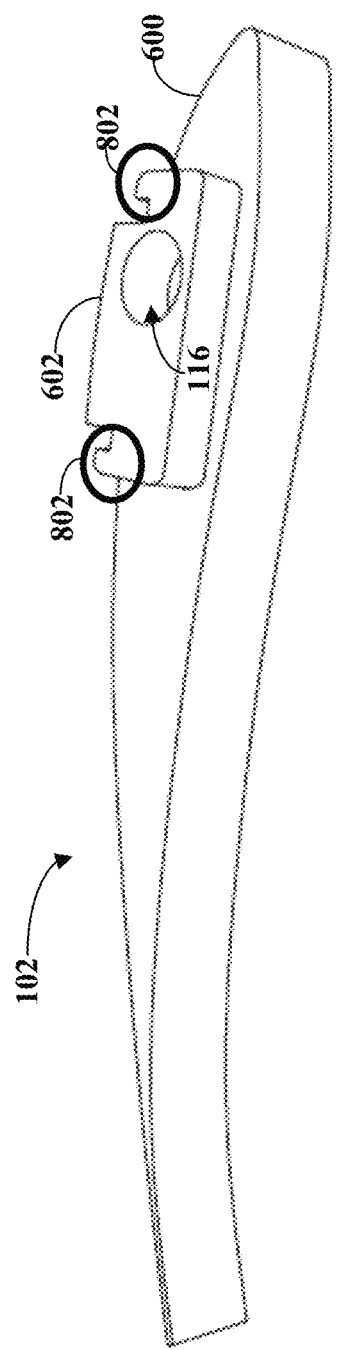

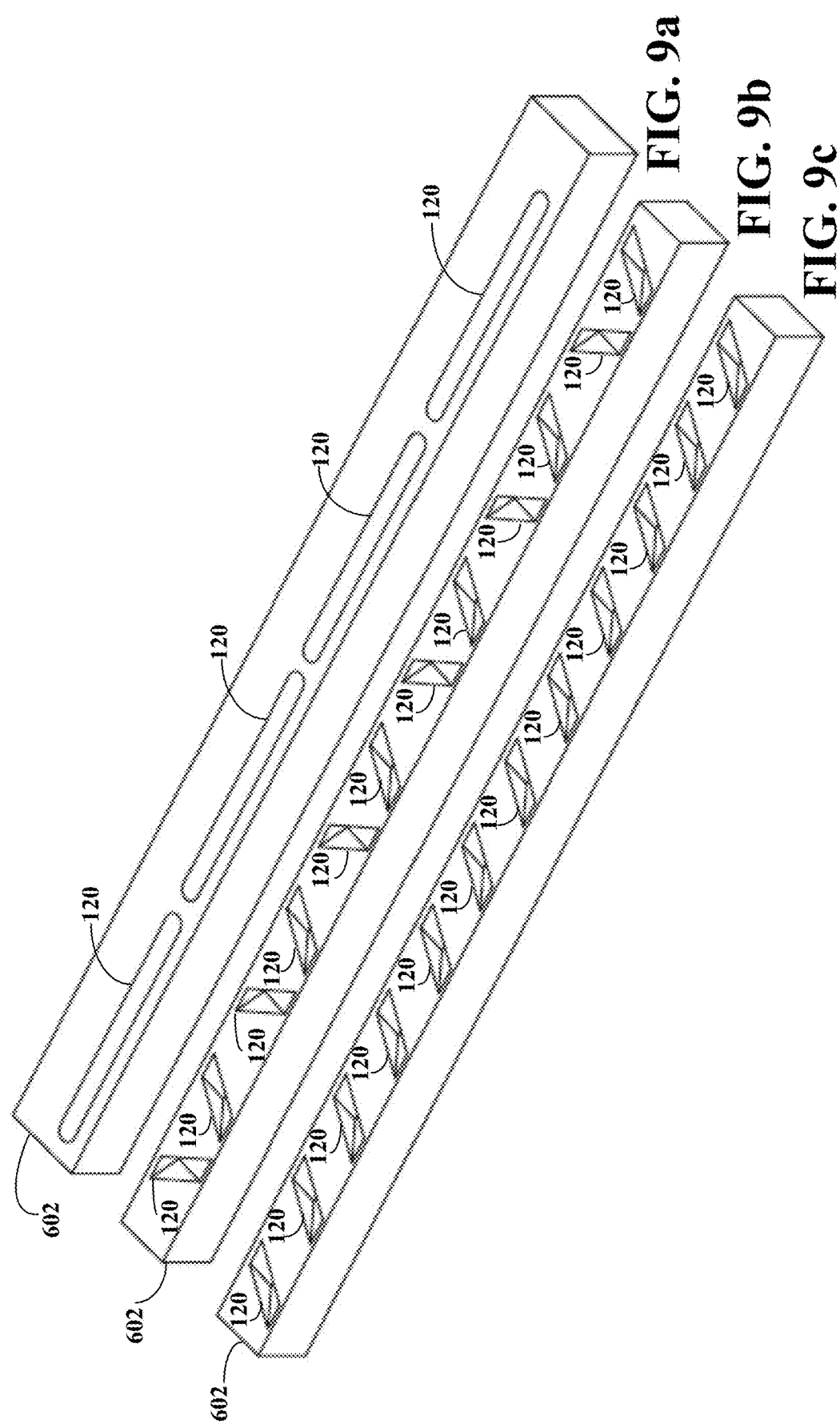

METHODS, SYSTEMS, AND DEVICES TO OPTIMIZE A FLUID HARVESTER

CROSS-REFERENCE TO RELATED APPLICATION

Benefit of U.S. Provisional Patent Application Ser. No. 65/582,482, filed Nov. 7, 2017, is hereby claimed and the disclosure incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, systems used to harvest wind energy use large masses of machinery high up in the air on tall towers. The machinery generally includes large rotor blades and a connected generator configured to generate electricity as the rotor blades rotate in the wind. The systems must be high up in the air and pivotable with the direction of the wind to efficiently use the rotor blades. Positioning the machinery on the top of the tower adds significant weight to the top of the system and imposes high materials usage in the machinery, tower, and tower foundation. Additionally, the large rotors can be fragile systems, which need to be made from high performance composites. Further, maintenance of the system is difficult as it has to be done high up in the air. These types of problems can become more significant when turbines are installed close to population centers and/or directly on buildings. Similarly, systems used to harvest water energy use large masses of rotating machinery underwater. Because the machinery is in an environment that is not generally easily accessible maintenance of the parts can be difficult. Additionally, the environment can be corrosive to the machinery requiring more frequent maintenance.

SUMMARY

The following is a brief summary of subject matter that is described in greater detail herein. This summary is not intended to be limiting as to the scope of the claims.

In an exemplary embodiment, provided is an apparatus for energy extraction from fluid flow. The apparatus includes a channel, an assembly, and an energy extraction device at least partially located in the channel. The assembly includes a plenum and the channel includes an inlet and an outlet that is in fluid communication with the plenum to allow flow therethrough. The assembly is configured to create a pressure differential between the plenum and the inlet of the channel. The pressure differential causes fluid flow from the inlet of the channel to the plenum. The energy extraction device is configured to extract energy from this fluid flow.

The assembly further includes an aperture extending from an exterior surface of the assembly to the plenum to allow flow therethrough. As such, a fluid flow path can be established from the inlet to the plenum and further to the exterior environment via the aperture. The apparatus additionally includes a control system configured to modify the pressure differential to control the fluid flow between the inlet of the channel and the plenum based on a characteristic of an environment of the assembly.

A method of extracting energy from fluid flow includes the step of generating fluid flow through a channel. An inlet of the channel is exposed to an external environment and an outlet of the channel is in fluid communication with a plenum of an assembly. The method further includes generating energy based upon the fluid flow. The energy can include at least one of electrical energy, mechanical energy, or pneumatic energy. The method yet further includes modifying a characteristic of the assembly to modify a velocity of fluid in the fluid flow.

Further, in accordance with various aspects, provided is an apparatus for energy extraction from fluid flow. The apparatus may include means for causing fluid flow between an inlet of a channel and a plenum fluidly connected to an outlet of the channel. The apparatus may further include means for extracting energy from the fluid flow. The apparatus may yet further include means for modifying the fluid flow based on a characteristic of an exterior environment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 8A and 8B illustrate yet another exemplary assembly.

FIGS. 9A-9C illustrate exemplary inserts with differing aperture arrangements.

DETAILED DESCRIPTION

Figure 1:
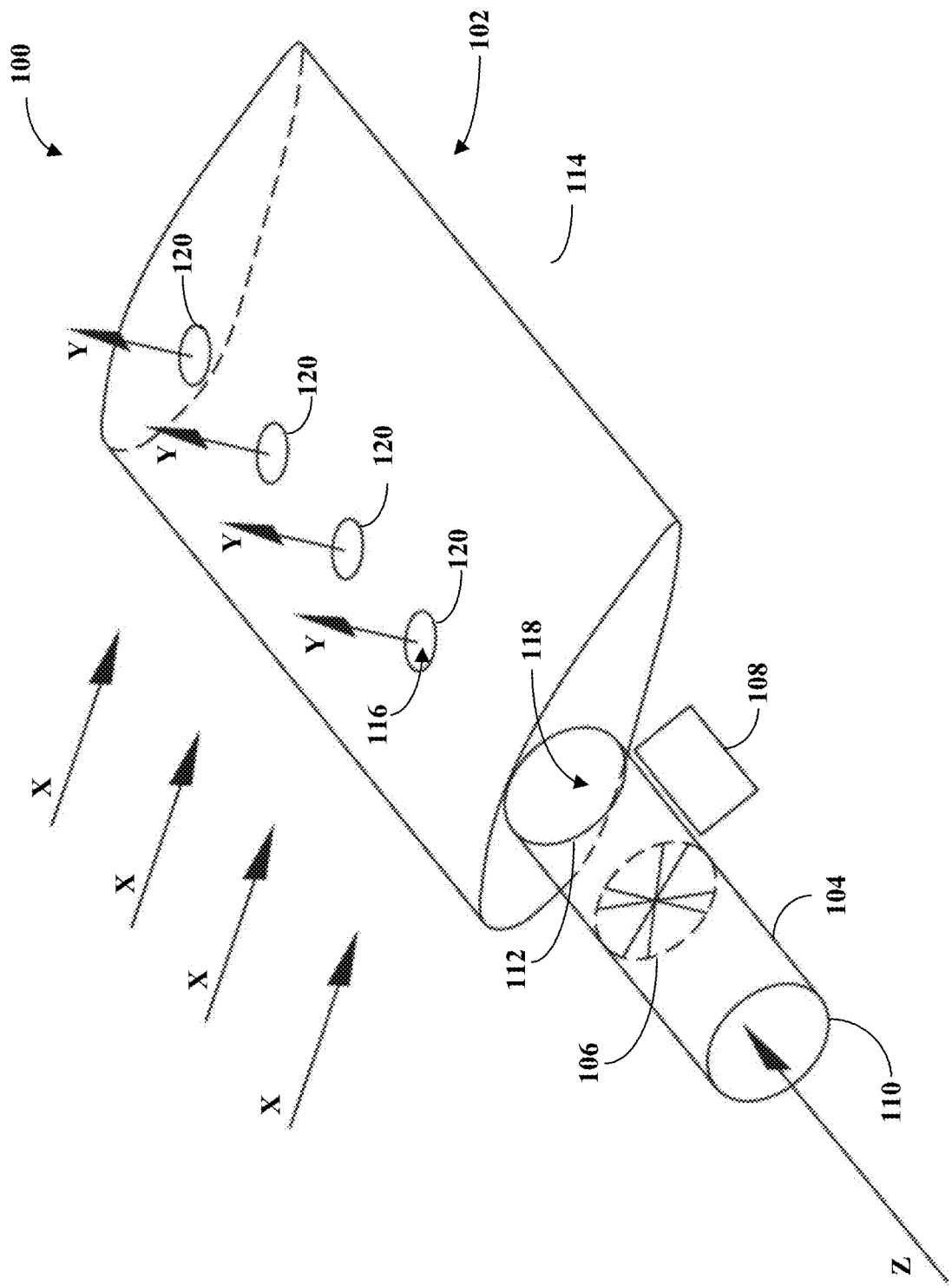
FIG. 1 illustrates an exemplary energy extraction apparatus.

Various technologies pertaining to extracting energy from fluid flow are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for using fluid flow to generate electrical power. The disclosed apparatus can be placed in a fluid flow stream and can use a pressure differential to "pull" fluid through an energy extraction device to generate the electrical power. The apparatus can "pull" the fluid from an inlet and discharge it into the fluid flow stream. The apparatus can modify the pressure differential based on a received input to control the amount of fluid being "pulled" and/or electricity being generated.

Turning to FIG. 1, illustrated is one embodiment of an apparatus 100 for energy extraction from fluid flow. The fluid can include gas, liquid, or the like. The apparatus 100 includes an assembly 102, a channel 104, an energy extraction device 106, and a control system, illustrated schematically as 108. The channel 104 and the assembly 102 may be in fluid communication to allow fluid flow therethrough. Broadly, the apparatus 100 can be configured to cause fluid flow along a fluid path from the channel 104 to the assembly 102 and further to an exterior environment as will be described in detail below. In one embodiment, at least a portion of the energy extraction device 106 is located along the fluid flow and may be configured to extract energy based on the fluid flow.

The channel 104 can include an inlet 110 and an opposing outlet 112 and can be configured to allow flow therethrough. In an embodiment, shown in FIG. 1, the channel 104 is substantially a hollow cylindrical tube with a circular cross-section. The channel 104 may take any shape consistent with allowing flow therethrough. For example, the cross-section of the exterior of the channel 104 may be oval, square, rectangular, triangular, or the like. The interior of the channel 104 may have a similar shape as the exterior or may vary. Additionally, although illustrated in FIG. 1 as a single tube, the channel 104 may comprise a network of interconnected tubes in fluid communication.

The assembly 102 can include a body 114 formed by at least two opposing sides. In an embodiment, shown in FIG. 1, the body 114 comprises two curved sides that connect at two opposing ends to form an airfoil. The airfoil includes a leading edge, an opposing trailing edge, and two curving sides extending therebetween. While the body 114 is described as having the shape illustrated in FIG. 1, other shapes are also contemplated. For instance, the body 114 can have a specific shape depending on the environment the assembly 102 is placed in (e.g. aerodynamic shape for an atmospheric environment, hydrodynamic shape for an aquatic environment, etc.). Further, the embodiment of the apparatus 100 illustrated in FIG. 1 includes one assembly 102 attached to the channel 104, however the apparatus 100 can include any number of assemblies attached to the same channel 104 or differing channels.

The body 114 may include an exterior surface and a plenum 116 that is at least partially enclosed by the exterior surface. FIG. 1 shows the plenum 116 comprising the entire interior of the body 114, however the plenum 116 may have any suitable shape.

The body 114 may further include a fluid pathway 118 to allow fluid communication between the plenum 116 and the outlet 112 of the channel 104. The body 114 may yet further include an aperture 120 that extends from the exterior surface of the body 114 to the plenum 116 to allow fluid flow between the plenum 116 and an environment outside the apparatus 100. In an embodiment, shown in FIG. 1, the body 114 can include a plurality of apertures 120, however any number of apertures 120 greater than zero is hereby contemplated. In the illustrated embodiment, shown in FIG. 1, the plurality of apertures 120 are arranged longitudinally along the body 114, although other arrangements are contemplated.

The apparatus 100 may be configured to use fluid dynamics to generate flow through the aperture 120 by generating a pressure differential between the plenum 116 and the outside environment. To generate this pressure differential, the apparatus 100 may be configured to deflect oncoming fluid in the outside environment (e.g. wind), represented by arrow "X", along the body 114. The deflection can be caused by at least one of an angle of the body 114 with respect to a direction of the oncoming fluid X flow (e.g. angle of attack), a shape of the body 114, or the like.

The deflection of the oncoming fluid X can result in both a pressure difference and/or an oncoming fluid X velocity difference between the two opposing sides of the body 114. A first side of the body 114 acts as a suction surface and have a lower average pressure and a higher average velocity than an opposing second side acting as a pressure surface having a higher average pressure and a lower average velocity.

In addition to being lower than the average pressure of the pressure side, the average pressure of the suction surface can be lower than the average pressure inside the plenum 116. Where the plenum 116 and the outside environment at the suction surface are in fluid communication, for example by way of the aperture 120, the difference in average pressure can cause fluid flow, represented by arrow "Y", from the plenum 116 to the outside environment at the suction surface.

This fluid flow Y out of the plenum 116 into the outside environment can create a pressure differential between the plenum 116 and the inlet 110 of the channel 104. Where the average pressure of the plenum 116 is lower than the average pressure at the inlet 110, the pressure differential can generate fluid flow, represented by arrow "Z", from the inlet 110 of the of channel 104 toward the plenum 116. Generally, the pressure differential can cause the fluid to be pulled from a higher pressure section of the apparatus 100 toward a lower pressure section of the apparatus 100.

The energy extraction device 106 may be located along a path of the fluid flow Z from the inlet 110 of the channel 104 to the plenum 116 and further to the outside environment. The energy extraction device 106 can be configured to obtain energy from the fluid flow Z by passing the fluid along and/or through a portion of the energy extraction device 106. The energy extraction device 106 can comprise an electric generator, a hydraulic pump, or the like. For example, illustrated in FIG. 1, where the energy extraction device 106 comprises an electric generator including a rotating fan, the rotating fan can be placed in the channel such that the fluid passes through the fan causing the fan blades to rotate and generate energy. Additionally, although illustrated in FIG. 1 as having a single energy extraction device 106, the apparatus 100 may include any number of energy extraction devices.

The energy extraction device 106 can be located at any suitable position along the flow path from the inlet 110 of the channel 104 to the plenum 116 and further to the outside environment. For example, as shown in FIG. 1, the energy extraction device 106 can be located in the channel 104 between the inlet 110 and the outlet 112. In another embodiment, the energy extraction device 106 can be located where the outlet 112 of the channel 104 connects to the plenum 116. In a yet further embodiment, the energy extraction device 106 can be located near the aperture 120 between the plenum 116 and the outside environment.

The control system 108 may be configured to receive an input and to modify the pressure differential between the plenum 116 and the inlet 110 of the channel 104 based on the received input. In one embodiment, the input can signify a characteristic(s) of the outside environment. The characteristic(s) of the outside environment can include at least one of humidity, temperature, airflow direction, airflow velocity, or the like. In another embodiment, the input can signify a characteristic(s) of the fluid flow within the apparatus 100 described above.

In one embodiment, the input can include data supplied by a sensor that is part of the control system 108 or in communication with the control system 108. For example, the sensor may be located along the flow path of fluid in the apparatus 100. The sensor can be configured to output a signal that is indicative of the characteristic(s) of the fluid flow (e.g., amount, velocity, etc.) at the sensor location. In another example, the sensor can be configured to output a signal that is indicative of an amount of energy being extracted by the energy extraction device 106. In a yet further example, the sensor may be configured to output a signal that is indicative of the characteristic(s) of the outside environment.

In another embodiment, the input can include data from a database. The database may include historical characteristic(s) of the outside environment and/or historical characteristic(s) of the apparatus 100. The historical characteristic(s) may include previous meteorological patterns, amount of energy extracted at a specific time or over a specific time period, or the like. The database may include projected characteristic(s) of the outside environment, such as forecasted meteorological patterns.

The control system 108 may modify the fluid flow between the plenum 116 and the inlet 110 of the channel 104 by modifying operational setpoints for the energy extraction device 106. For instance, the energy extraction device 106 can include a propeller with variable speed and/or variable blade pitch. The control system 108 may modify the rate of fluid flow by either speeding up or slowing down rotation of the propeller. An increase in propeller rotation speed can cause an increase in fluid flow rate.

The control system 108 may modify the pressure differential between the plenum 116 and the inlet 110 of the channel 104 by modifying fluid flow Y between the plenum 116 and the outside environment. Because the control system 108 may modify the fluid leaving the plenum 116 and therefore lower the average pressure in the plenum 116, the control system 108 may modify the pressure differential between the plenum 116 and the inlet 110 of the channel 104. By extension, the control system 108 can modify the amount and/or velocity of flow from the inlet 110 of the channel 104 to the plenum 116 and the amount of energy obtained by the energy extraction device 106. Where the energy extraction device 106 comprises a generator with a fan, modifying the velocity of flow from the inlet 110 of the channel 104 to the plenum 116 may further be used to modify the speed at which the fan rotates. The control system 108 may further be configured to prevent fluid flow from the apparatus 100 to the outside environment by closing the fluid connection between the apparatus 100 and the outside environment.

In an embodiment, the control system 108 may modify the fluid flow Y between the plenum 116 and the outside environment by pivoting the assembly 102 with respect to a direction of oncoming fluid X flow in the outside environment, the angle of attack. In this embodiment the assembly 102 may be pivotally connected to the channel 104 such that the assembly 102 pivots about an axis of rotation extending through a center of the outlet 112 of the channel 104. In an example of this embodiment, where the body 114 comprises an airfoil, the control system 108 can pivot the airfoil such that the leading edge of the airfoil faces into the oncoming fluid X.

Figure 2:
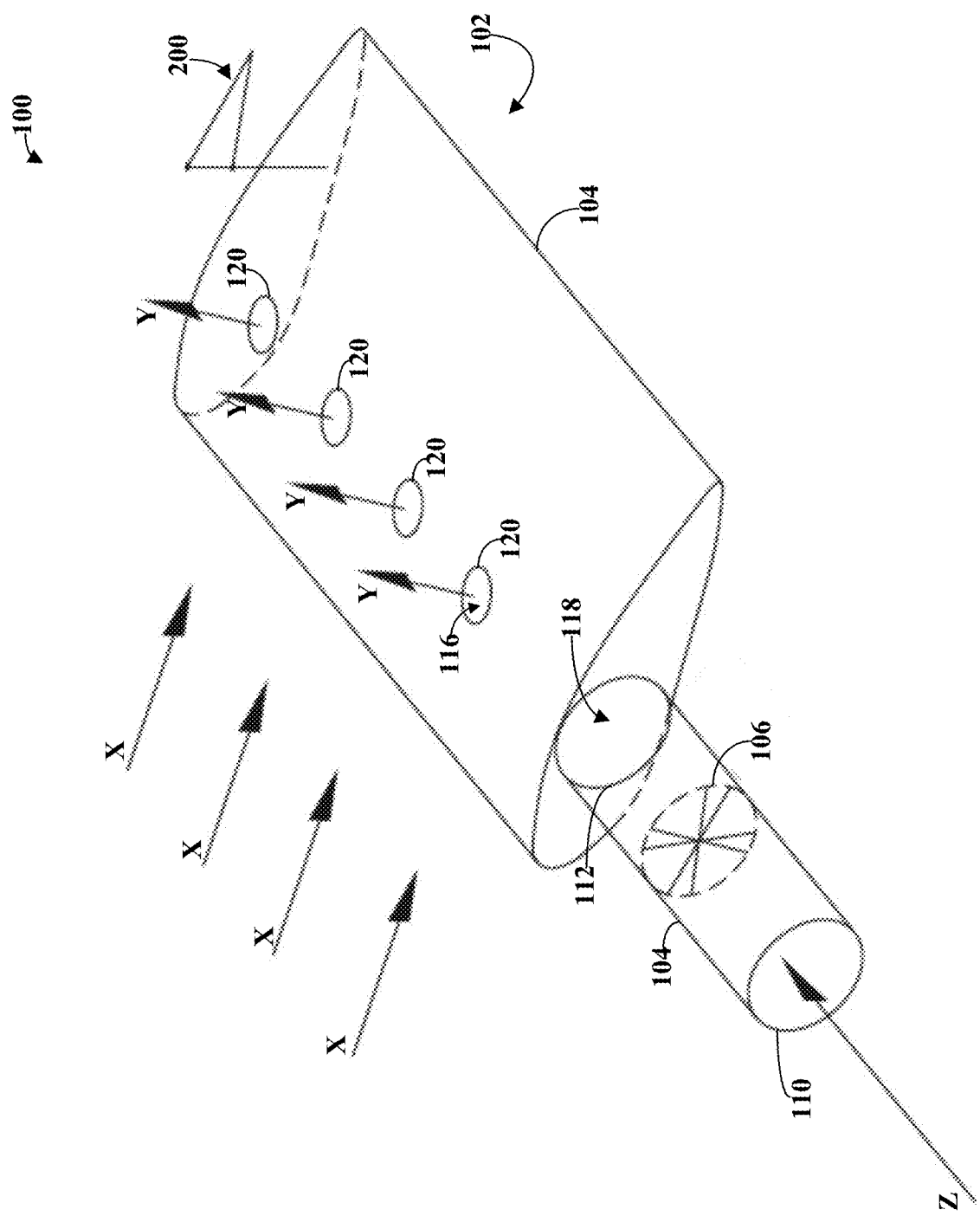
FIG. 2 illustrates another exemplary energy extraction apparatus.

In one version of this embodiment, illustrated in FIG. 2, the control system 108 comprises a passive system 200 (e.g., similar to a wind vane, windsock, etc.) configured to passively rotate the assembly 102 based on the direction of the oncoming fluid X. The passive system 200 can be attached to a longitudinal end of the assembly 102 and be configured to rotate the assembly 102 as the passive system 200 rotates into the oncoming fluid X. Alternatively, the passive system 200 can be located at other parts of the assembly 102, for example along the leading edge of the airfoil or the like. In yet another example, the assembly 102 can be designed and weighted such that a portion of the assembly 102 points towards incoming fluid flow.

Figure 3:
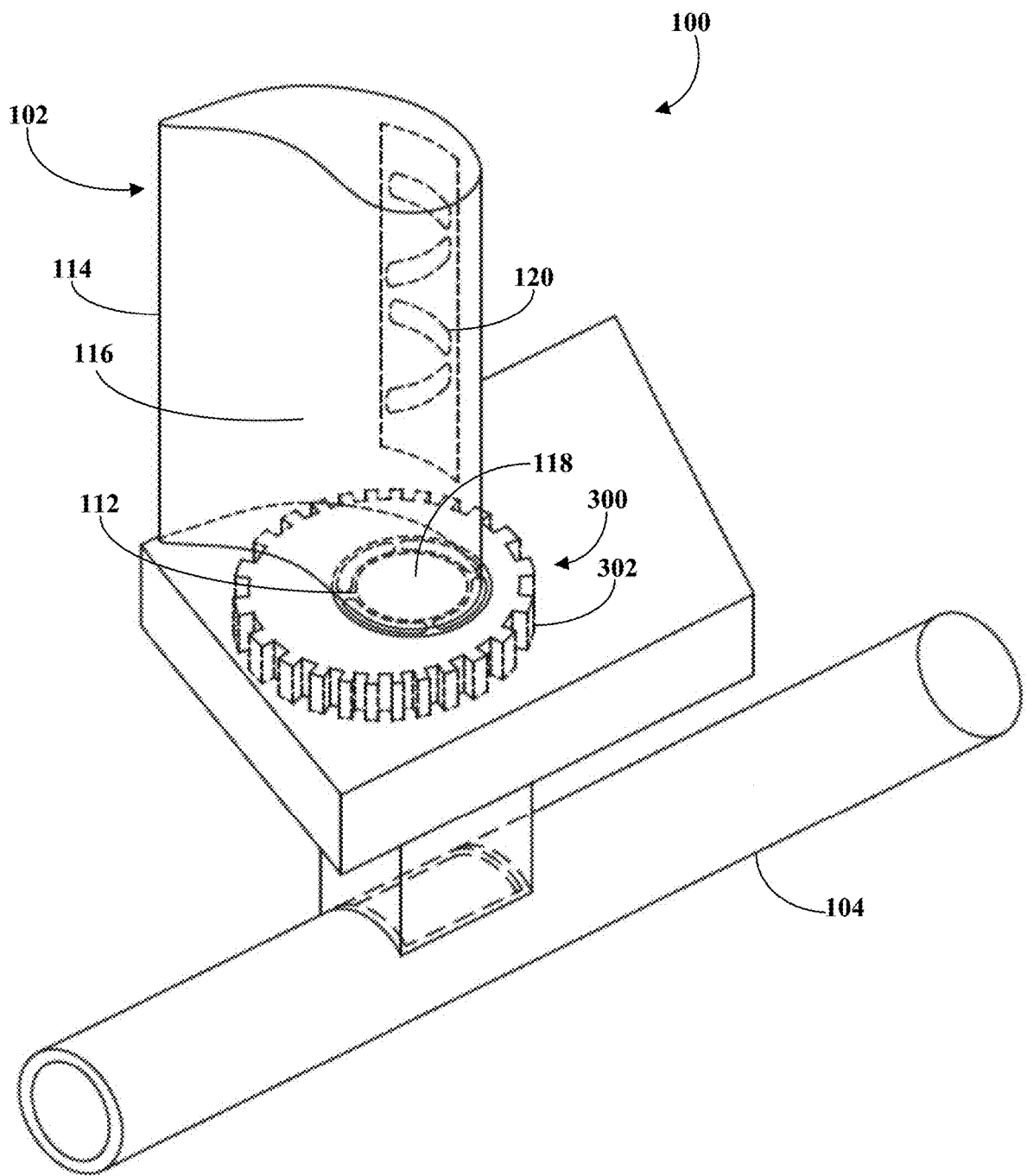
FIG. 3 illustrates yet another exemplary energy extraction apparatus.

In another version of this embodiment, illustrated in FIG. 3, the control system 108 comprises an active system 300. In this embodiment, the active system 300 may include a sensor configured to output a signal that is indicative of a direction of the oncoming fluid X and a mechanism (e.g. motor, gear system, etc.) configured to pivot the assembly 102 based on the output of the sensor. The illustrated version of the control system 108 comprises a plurality of gears 302 that may be configured to pivot the assembly 102. At least one of the plurality of gears 302 may be connected to a motor via pinion engagement (not shown). In addition, at least one of the gears 302 can include a chamfer configured to prevent accidental rotation of the gear 302. Further, at least one of the gears 302 can include slots and a corresponding gear 302 can include a pin extending through the slot to define rotation limits for the slotted gear. In the illustrated version, at least one gear 302 of the system of gears is located between the assembly 102 and the outlet 112 of the channel 104, however the plurality of gears and/or the motor can be located at any suitable position with respect to the assembly 102.

In another embodiment, the control system 108 can modify the fluid flow through the apparatus 100 by modifying an interior volume of the plenum 116 and/or the channel 104. By modifying the interior volume of the plenum 116 and/or the channel 104, the control system 108 modifies the amount of fluid necessary to adjust pressure therein. Modifying the interior volume of the plenum 116 and/or channel 104 can also control the velocity of fluid flow therethrough.

Figure 4:
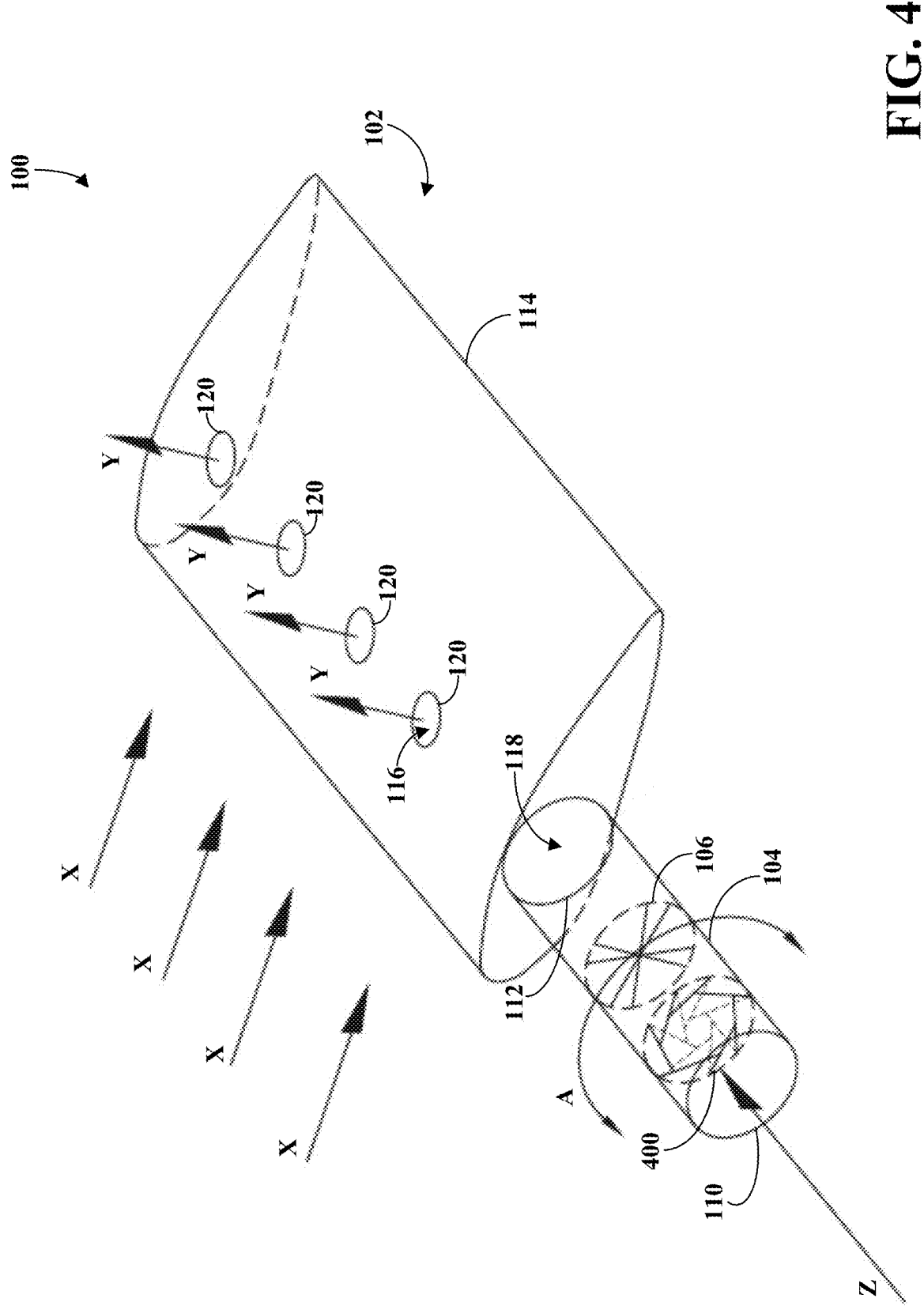
FIG. 4 illustrates a further exemplary energy extraction apparatus.

In a version of this embodiment, illustrated in FIG. 4, the control system 108 can include an adjustable choke 400, that can adjust rotationally along arrow A, configured to adjust the interior volume of the channel 104. In another version, the control system 108 can include a sleeve located at a portion (e.g., the channel 104 and/or the plenum 116) of the apparatus 100 configured to adjust in size to adjust the interior volume of the portion.

In yet another embodiment, the control system 108 can modify the fluid flow Y between the plenum 116 and the outside environment by modifying a size of the aperture 120. By modifying the size of the aperture 120, the control system 108 can modify the rate of fluid flow Y from the plenum 116 to the outside environment. For example, by decreasing the size of the aperture 120 the control system 108 may decrease the rate at which pressure decreases in the plenum 116. By extension, decreasing the rate at which pressure decreases in the plenum 116 further decreases the rate of fluid flow Z from the inlet 110 of the channel 104 to the plenum 116.

Figure 5:
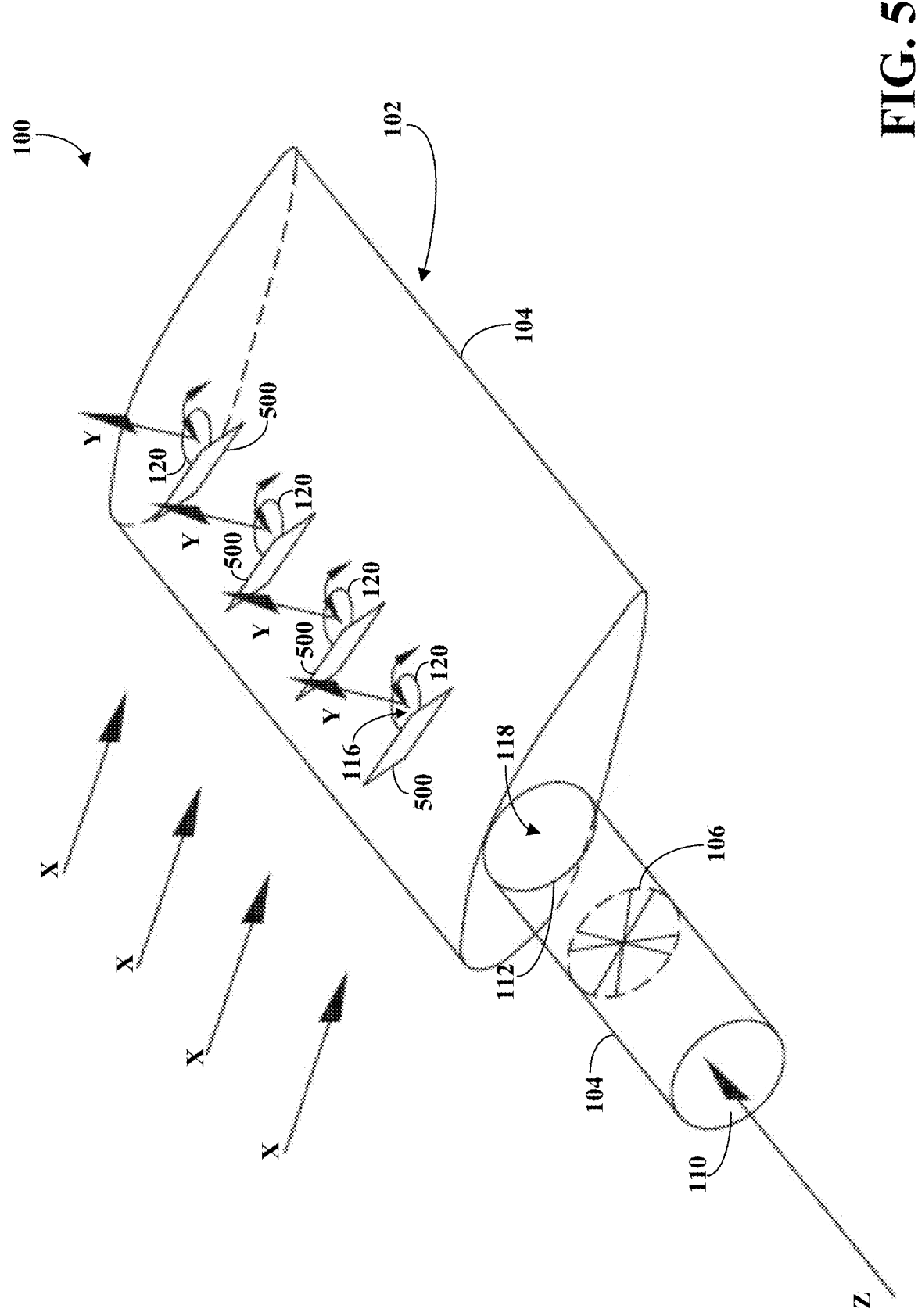
FIG. 5 illustrates a yet further exemplary energy extraction apparatus.

In a version of this embodiment, the control system 108 can comprise an adjustable shutter configured to modify a size of the aperture 120. In another version of this embodiment, illustrated in FIG. 5, the assembly 102 includes a plurality of apertures 120 and the control system 108 includes a corresponding number of separate adjustable shutters 500 each configured to modify a size of a corresponding aperture 120. In yet another version of this embodiment, the assembly 102 includes a plurality of apertures 120 and the control system 108 includes an adjustable shutter configured to adjust the apertures 120 in sequence, e.g. closing an aperture 120 before proceeding to adjust the next aperture 120 in the sequence.

In the embodiments illustrated above, the plenum 116 and the corresponding aperture(s) 120 are formed by the body 114 comprising a single unit. Turning now to FIGS. 6-9c, illustrated is an assembly 102 comprising varying alternatives for forming the plenum 116 and/or the aperture(s) 120. In the illustrated embodiments, the assembly 102 includes a structural frame/skin 600 (hereinafter "frame 600") with an indentation and an insert 602 that may be removably placed within the indentation. The insert 602 and the frame 600 can be made of the same material or can be made of different material. For instance, to reduce the cost of changing aperture 120 and/or plenum 116 size and/or arrangement, the frame 600 can be made of aluminum extrusions, carbon fiber pultrusion, or the like while the insert 602 is made of lower cost material (e.g. plastic).

Figure 6:
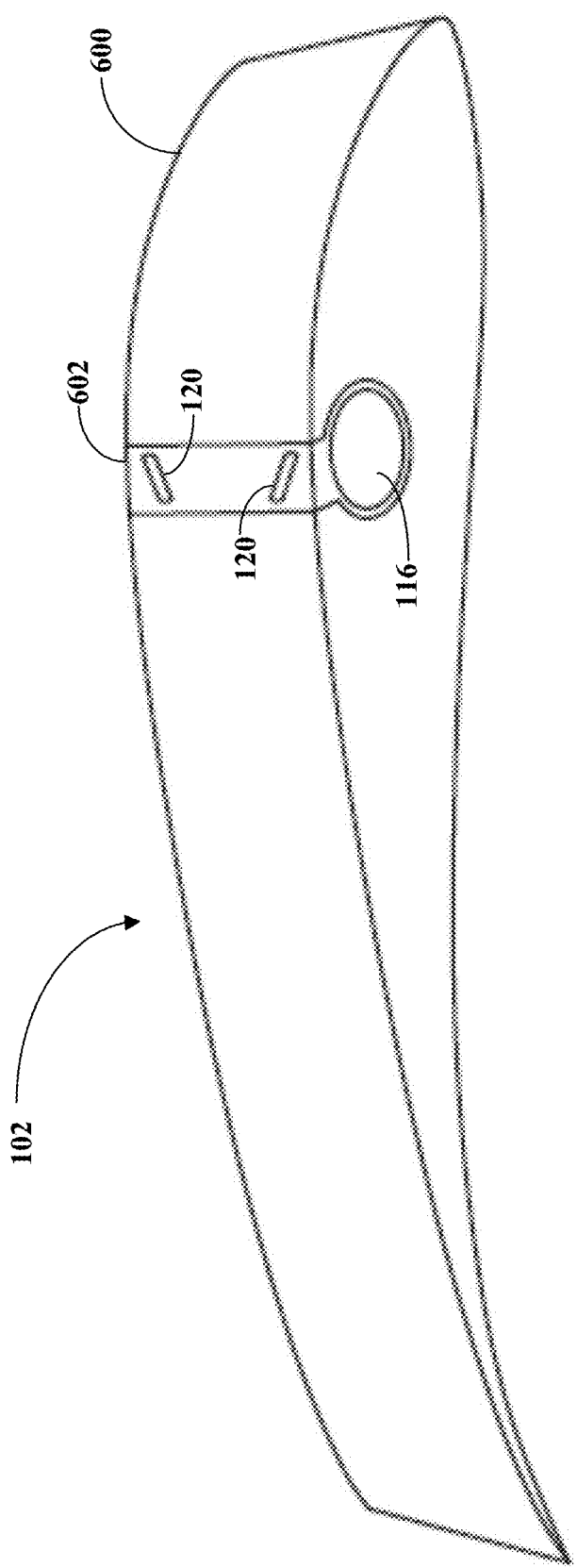
FIG. 6 illustrates an exemplary assembly.
Figure 7:
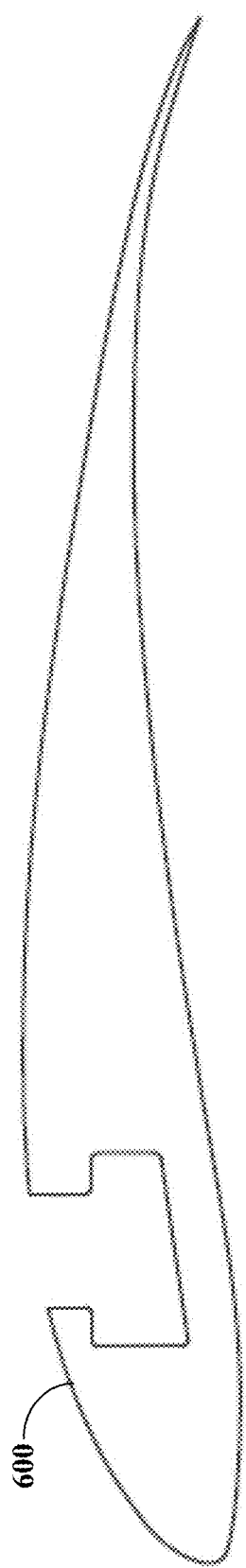
FIG. 7 illustrates another exemplary assembly

The insert 602 can include the plenum 116 and/or the aperture(s) 120. The use of an insert 602 may allow a user to manufacture a single frame 600 while allowing the user to adjust the size of the plenum 116, the size of the aperture(s) 120, the number of apertures 120, the orientation of the aperture(s) 120, and/or the like. The adjustment may be based on the setting of the assembly 102. The insert 602 and the frame 600 may be configured such that when the insert 602 is removably secured in the indentation, the insert 602 is flush with the frame 600 as can be seen in FIG. 6. However, the insert 602 need not be flush with the frame 600 and can have any position consistent with the intended use.

To prevent the insert 602 from unintentionally coming out of the indentation during use, at least one of the insert 602 or the frame 600 can be configured to removably secure the insert 602 in place. For example, the insert 602 can comprise portions of varying size. In one embodiment, illustrated in FIG. 6, the insert 602 may include a cylindrical portion forming the plenum 116 and a smaller portion extending therefrom including an aperture 120. Consequently, the indentation may include a corresponding outline. In another embodiment, illustrated in FIG. 7, the indentation may include a stepped outline with a larger and a smaller trapezoidal section. The insert 602 may have a corresponding shape. In a yet further embodiment, the insert 602 can comprise a plate including an aperture 120. The frame 600 defines the plenum 116 and when the insert 602 is attached to the frame 600 the plenum 116 is at least partially enclosed by the combination of the frame 600 and the insert 602.

In a yet further embodiment, illustrated in FIGS. 8a and 8b, the frame 600 and the insert 602 can include corresponding locking tabs 800 and 802. The locking tab(s) 800 formed on frame 600 can include a first arm extending inwardly into the indentation and a second arm extending radially therefrom. The locking tab(s) 802 formed by the insert 602 can comprise corresponding structure configured to abut a juncture formed by the first arm and the second arm when the insert 602 is inserted into the frame 600.

As discussed above, the use of an insert 602 can allow a user to adjust the type, the number, and/or the orientation of the aperture 120 without having to remove the entire assembly 102. FIGS. 9a-9c illustrates various alternatives for aperture 120 arrangement on the insert 602. For example, as illustrated in FIG. 9a, the aperture 120 can comprise a longitudinal slot and the insert 602 can include a plurality of apertures 120 arranged longitudinally. In another example, the aperture 120 can comprise an angled vortex generator. The insert 602 can include a plurality of the apertures 120 that are alternating, as illustrated in FIG. 9b, and/or aligned, as illustrated in FIG. 9c.

Figure 10:
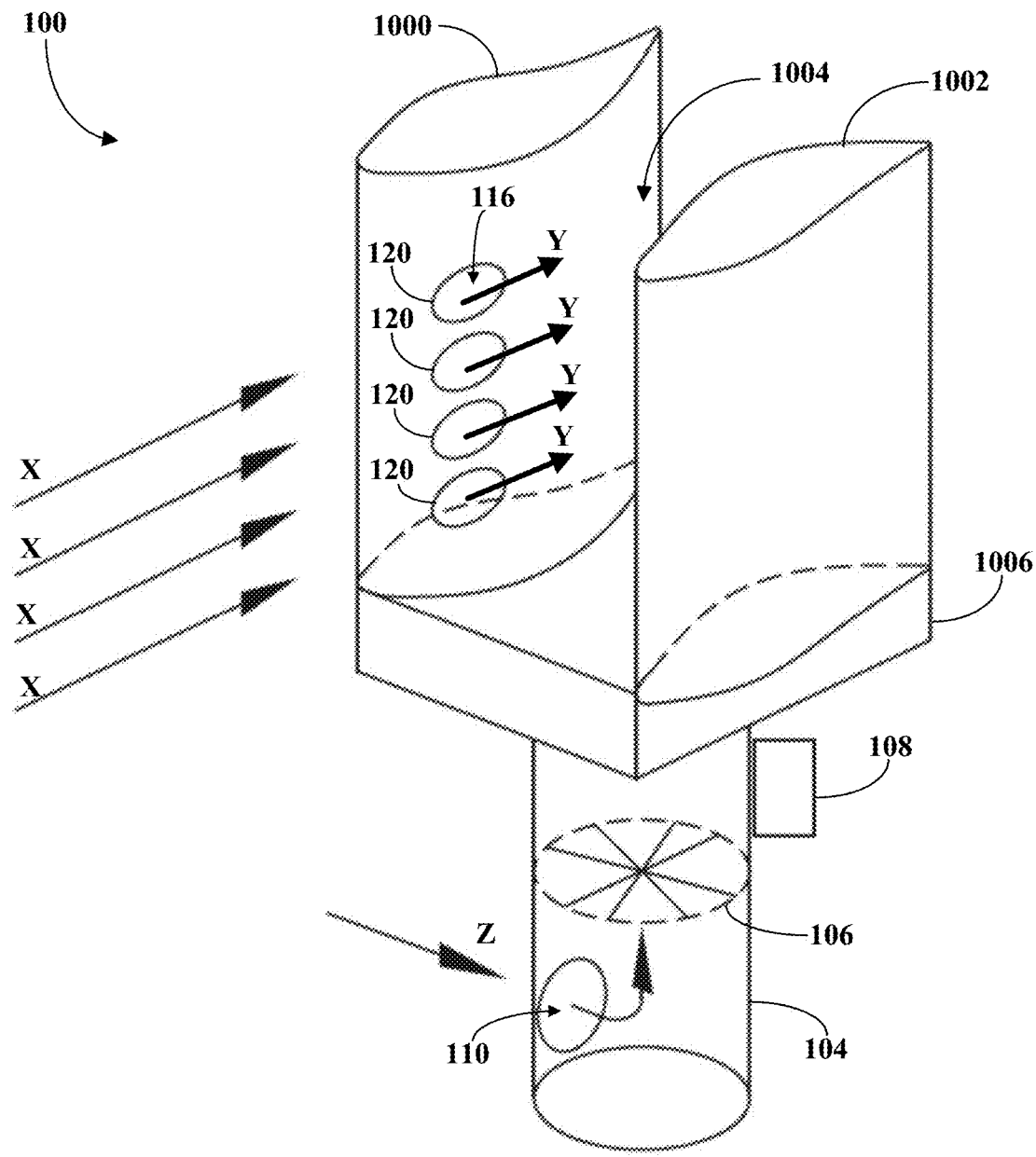
FIG. 10 illustrates another exemplary energy extraction apparatus.
Figure 11:
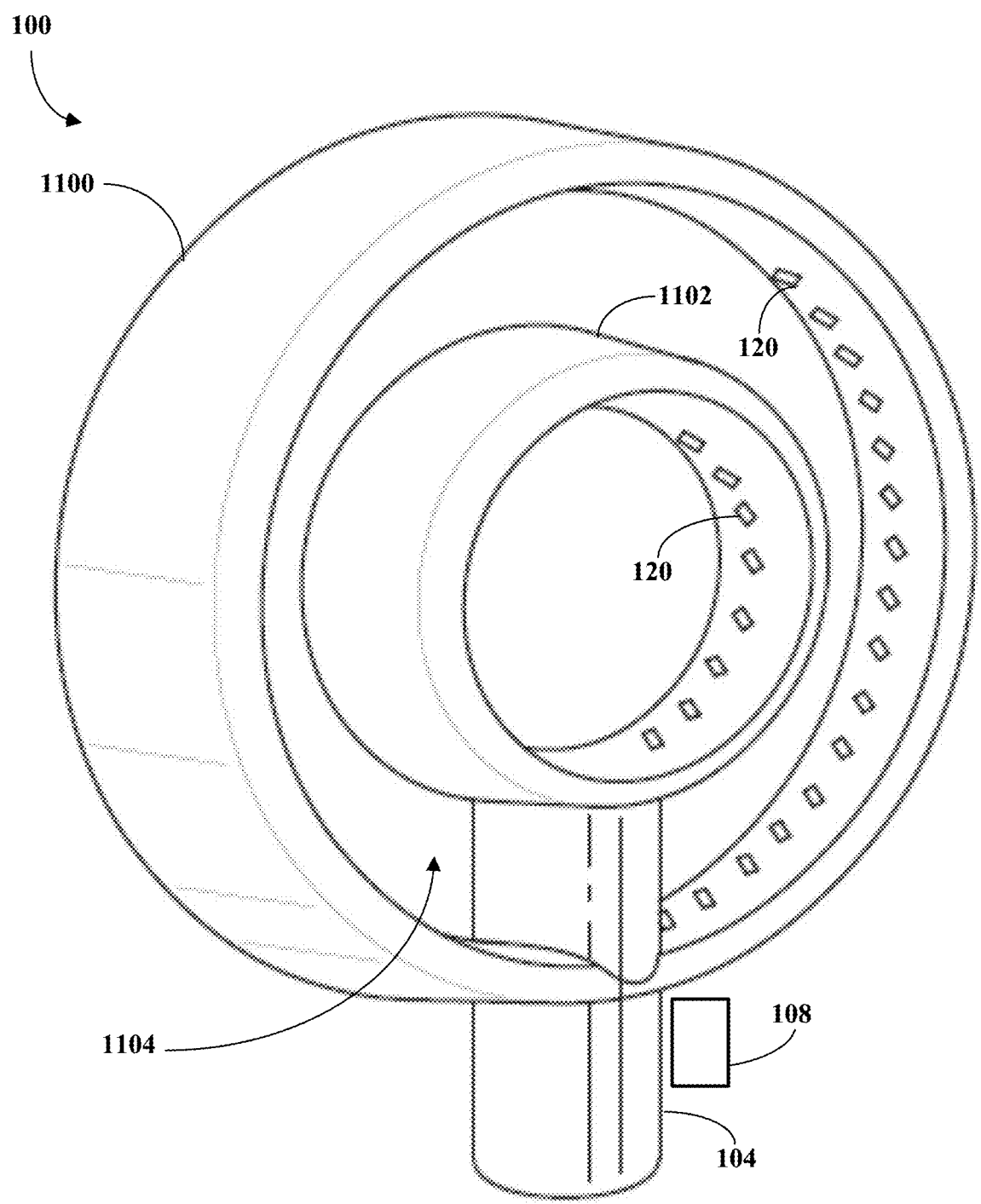
FIG. 11 illustrates yet another exemplary energy extraction apparatus.

Turning now to FIGS. 10 and 11, illustrated is an embodiment of the apparatus 100 including two assemblies. The two assemblies can be arranged to form a corridor therebetween. For example, in an embodiment, illustrated in FIG. 10, the assemblies 1000 and 1002 are arranged parallel to each other along a longitudinal axis and are spaced a distance from each other to define the corridor 1004 therebetween. In another embodiment, illustrated in FIG. 11, the assemblies 1100 and 1102 are circular and have different diameters, the assemblies have a concentric arrangement to define the corridor 1104. The two assemblies can be arranged in any configuration sufficient to form the corridor therebetween. The corridor 1004 may take any suitable shape and/or orientation (e.g. horizontal, vertical, circular, triangular, etc.).

Arranging two assemblies to form a corridor therebetween can provide certain benefits. For example, the use of a corridor can cause up to a 20-fold increase of outside environment fluid flow pressure exerted on each body of the assemblies before flow begins to break down due to viscous forces in the outside environment fluid flow. Additionally, the use of a corridor can cause an increase in velocity of fluid flow through the apparatus 100 because of the increased pressure.

In the embodiment illustrated in FIG. 10, the two assemblies 1000 and 1002 may be arranged such that the oncoming fluid X flow through the corridor 1004 therebetween has a lower pressure than the surrounding oncoming fluid X flow. Consequently, the side of each assembly 1000 and 1002 that faces inwardly into the corridor 1004 may act as a suction surface and the side of each assembly 1000 and 1002 that faces outwardly from the corridor 1004 may act as a pressure surface. In this arrangement, the aperture 120 of each assembly 1000 and 1002 may be located on the suction surface so as to face into the corridor 1004. Therefore, the fluid in the plenum 116 of each assembly 1000 and 1002 may be configured to flow into the corridor 1004 when the average pressure in the corridor 1004 is lower than the average pressure in the plenum(s) 116.

Alternatively, in the embodiment illustrated in FIG. 11, the suction surface of each of the assemblies 1100 and 1102 may be placed in tandem, i.e. both suction surfaces are on the inner side of each respective ring-shaped assembly 1100 and 1102. The ring-shaped assemblies 1100 and 1102 can be arranged to amplify the wake expansion caused by oncoming fluid X flow through the ring-shaped assemblies 1100 and 1102. The outer ring-shaped assembly 1100 may use the presence of the inner ring-shaped assembly 1102 to amplify the wake. The inner ring-shaped assembly 1102 may use the opposing ends of the inner ring-shaped assembly 1102 to amplify the wake.

In the embodiments illustrated in FIGS. 10 and 11, the two assemblies 1000 and 1002, 1100 and 1102 respectively, are shown sharing a channel 104 and an energy extraction device 106. Alternatively, each of the two assemblies 1000 and 1002, 1100 and 1102 respectively, can have a separate channel 104 with an energy extraction device 106 located therein. The separate channels 104 can each be connected to a main channel thus sharing a common inlet or each can have their own separate inlet. Any suitable arrangement of channels and/or energy extraction devices is hereby contemplated for the use of a plurality of assemblies.

The embodiments illustrated in FIGS. 10 and 11 further include the control system 108, similar to the one described above, configured to modify a pressure differential between the plenum 116 of each assembly and their corresponding channel inlet. The control system 108 can be configured to modify each assembly separately and/or synchronously. As discussed above, the control system 108 is configured to modify the pressure differential based on the received input.

For example, in the embodiment illustrated in FIG. 10, the apparatus 100 can further include a plate 1006 that both assemblies are attached to. In this embodiment, the plate 1006 is located between and attached to both assemblies and the outlet 112 of the channel 104. The plate 1006 can include therein fluid flow path(s) connecting the outlet 112 of the channel 104 and each of the assemblies. The plate 1006 can be pivotably attached to the channel 104 such that the control system 108 can pivot the assemblies synchronously by pivoting the plate 1006. The apparatus 100 can further include a top cover (not pictured) opposite the plate 1006. The assemblies can be pivotally attached to the top cover in addition to being pivotally attached to the plate 1006.

In another example, the control system 108 can be configured to modify the distance between the two assemblies. By adjusting the distance between the two assemblies, the control system 108 can modify the average pressure in the corridor 1004 between the two assemblies. Modifying the average pressure in the corridor 1004 can, by extension, modify the amount of energy extracted from the fluid flow within the apparatus 100.

In yet another example, the control system 108 can be configured to separately modify the angle of attack of each assembly. By adjusting the angle of attack for only one of the two assemblies, the control system 108 can taper the corridor 1004 therebetween along the length of the assemblies. This tapering can be seen in FIG. 12.

Figure 12:
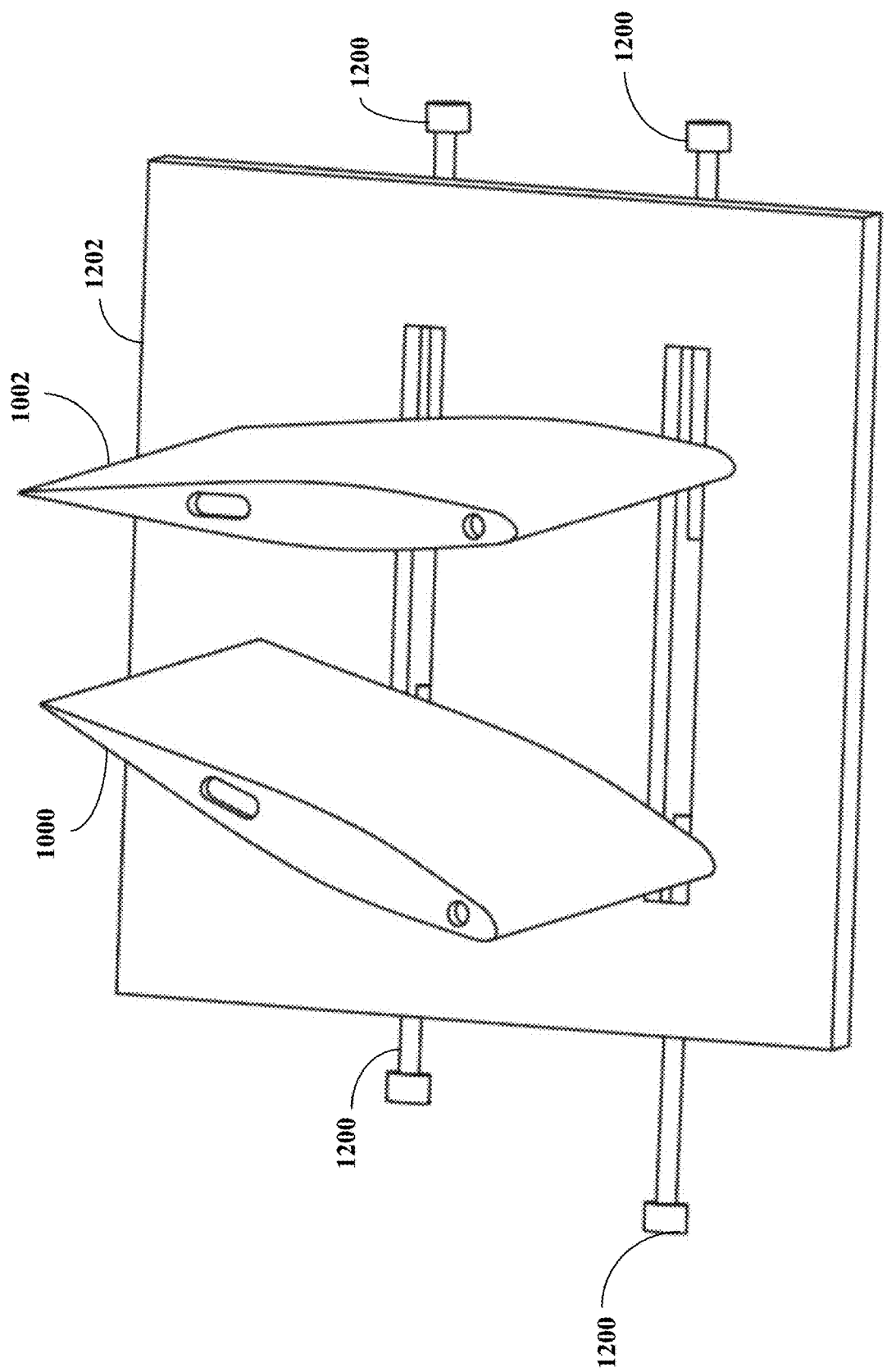
FIG. 12 illustrates an exemplary adjustment system for an energy extraction apparatus.

Turning to FIG. 12, illustrated is an embodiment of mechanisms that can be used to modify the distance between and/or the angle of attack for each of the pair of assemblies 1000 and 1002 from FIG. 10. The illustrated mechanism comprises one possible embodiment of structure capable of modifying the distance between and/or the angle of attack for each of the pair of assemblies and any suitable structure and/or system is hereby contemplated. In the illustrated embodiment, the mechanisms may comprise a plurality of rods 1200 connected to each of the assemblies 1000 and 1002 that can be configured to move at least a portion of each of the assemblies 1000 and 1002. The mechanism further includes a plate 1202, the plate 1202 can be the same plate 1006 discussed above with reference to FIG. 10 or can be a separate plate. Further, The plate 1202 further includes a plurality of sleeves, the number of sleeves can correspond to the number of rods 1200 or can vary. Each rod 1200 can slidably be placed in a corresponding sleeve. Because the rod 1200 is connected to an assembly 1000 and 1002, sliding movement of the rod 1200 in the sleeve can cause corresponding movement in the attached assembly 1000 and 1002. The number of rods 1200 attached to each of the pair of assemblies 1000 and 1002 can be the same, as in the illustrated embodiment, or can differ.

In the illustrated embodiment shown in FIG. 12, the mechanism includes two rods 1200 for each of the assemblies 1000 and 1002. With reference to a first of the assemblies 1000 and 1002, a first rod 1200 is attached to a first portion of the assembly and a second parallel rod 1200 is attached to a second portion of the assembly. The distance between the first assembly and the second assembly can be adjusted by moving the first and second rod 1200 in the same direction in unison. The angle of attack for the first assembly can be adjusted by moving one rod 1200 while keeping the other stationary or by moving the rods 1200 in opposite directions at the same time. Further, while not depicted, a top cover can be arranged in parallel with the plate 1202, such that fluid is directed between the assemblies 1000 and 1002.

The control system 108 can further include an actuator configured to adjust the position of the rods 1200 based on the received input. Each rod 1200 can have a separate actuator or at least two of the rods 1200 can share an actuator. The actuator can comprise any suitable mover (e.g. hydraulic, pneumatic, mechanical, electrical, etc.).

Figure 13:
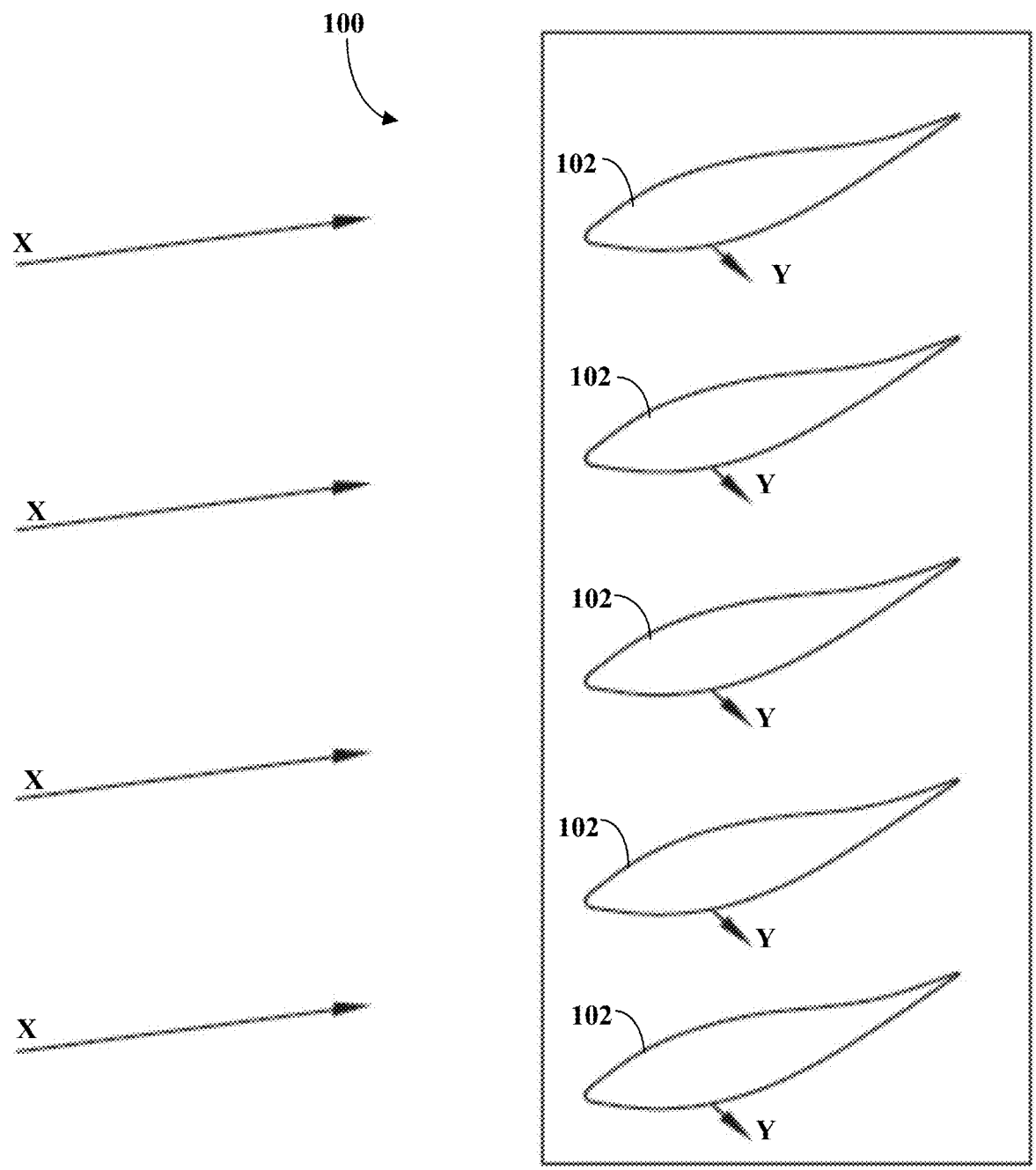
FIG. 13 illustrates another exemplary energy extraction apparatus.

In an embodiment, illustrated in FIG. 13, the apparatus 100 can include a plurality of separate assemblies 102. A control system 108 for the plurality of separate assemblies 102 can be configured to separately modify the pressure differential between the plenum 116 and the inlet of the channel 104 based on received input. For example, the control system 108 can adjust the angle of attack of one of the assemblies 102 while the other assemblies 102 remain static. Alternatively, the control system 108 for the plurality of separate assemblies 102 can be configured to synchronously adjust the angle of attack for more than one of the assemblies 102.

Figure 14:
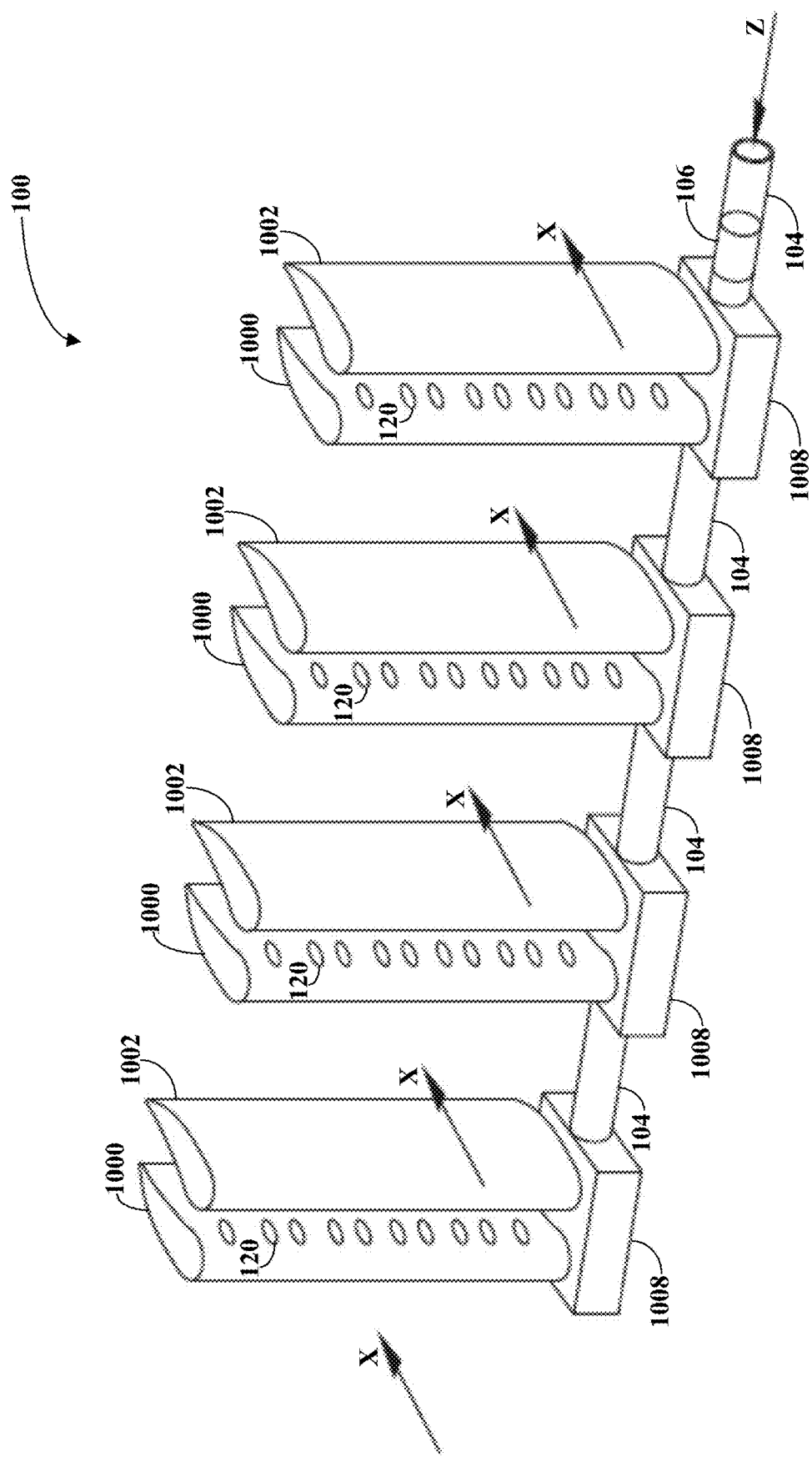
FIG. 14 illustrates yet another exemplary energy extraction apparatus.

In another embodiment, the apparatus 100 can include a plurality of paired assemblies 1000 and 1002 as described above with reference to FIG. 10. As illustrated in FIG. 14, the plurality of paired assemblies 1000 and 1002 can be arranged sequentially along a shared channel 104 with an energy extraction device 106 arranged in the channel 104 before the first paired assemblies 1000 and 1002 in the sequence. In the illustrated embodiment, the plurality of paired assemblies 1000 and 1002 are arranged side by side. In another embodiment, the plurality of paired assemblies 1000 and 1002 are arranged longitudinally such that the corridor 1004 of each of the paired assemblies 1000 and 1002 are in sequence.

In another embodiment, the apparatus 100 includes an energy extraction device 106 before each of the paired assemblies 1000 and 1002 in the sequence. The plurality of paired assemblies 1000 and 1002 can be arranged parallelly, as illustrated, or can be arranged in any suitable formation. Additionally, the embodied apparatus 100 can be placed on a building (e.g. house, store, skyscraper, etc.) to take advantage of wind flowing against the building.

Figure 15:
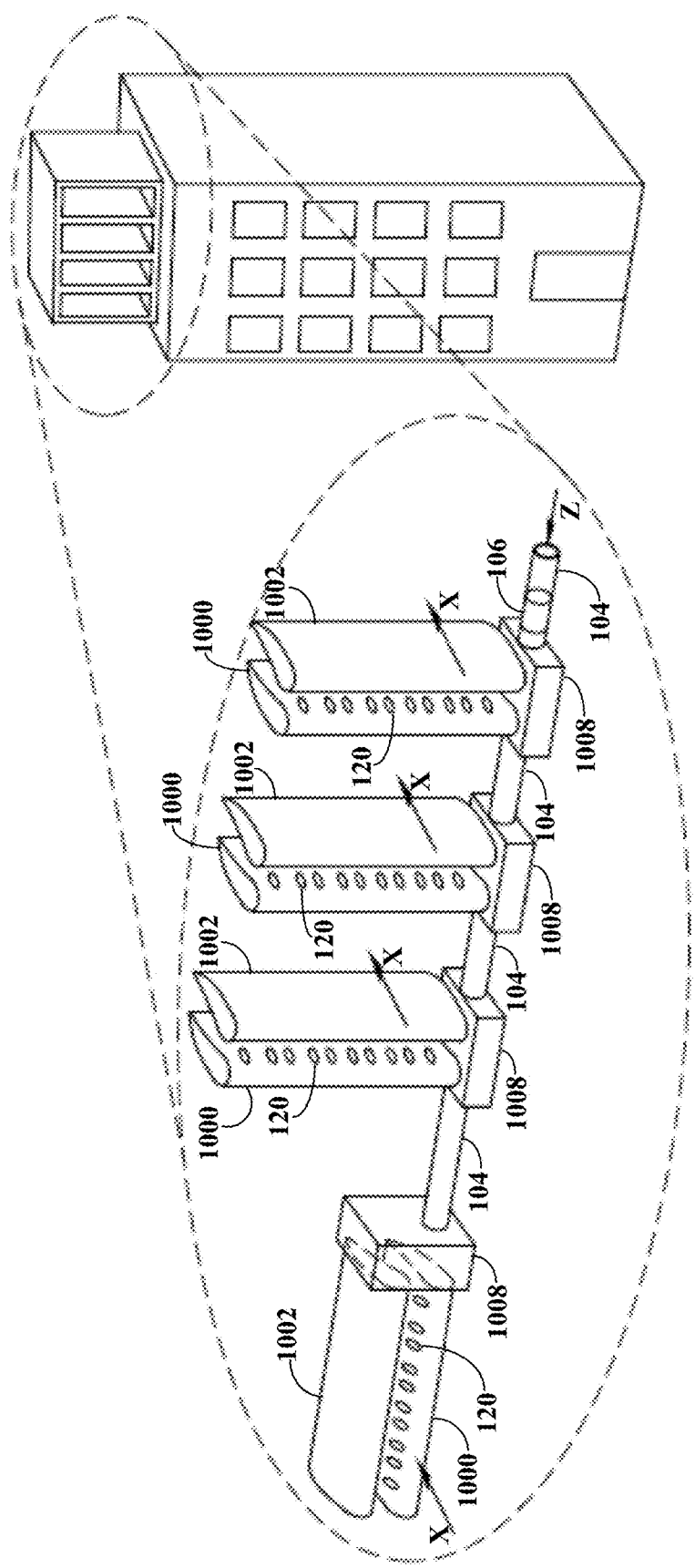
FIG. 15 illustrates a further exemplary energy extraction apparatus.

In yet another embodiment, the apparatus 100 includes a plurality of paired assemblies 1000 and 1002 as described above in different orientations. As illustrated in FIG. 15, the apparatus 100 includes at least one pair of assemblies 1000 and 1002 orientated vertically and one pair of assemblies 1000 and 1002 orientated horizontally. Further, as shown in the illustrated embodiment, the apparatus 100 can be placed on the roof of a building (e.g. house, store, skyscraper, etc.) to take advantage of wind flowing over the roof of the building.

Figure 16:
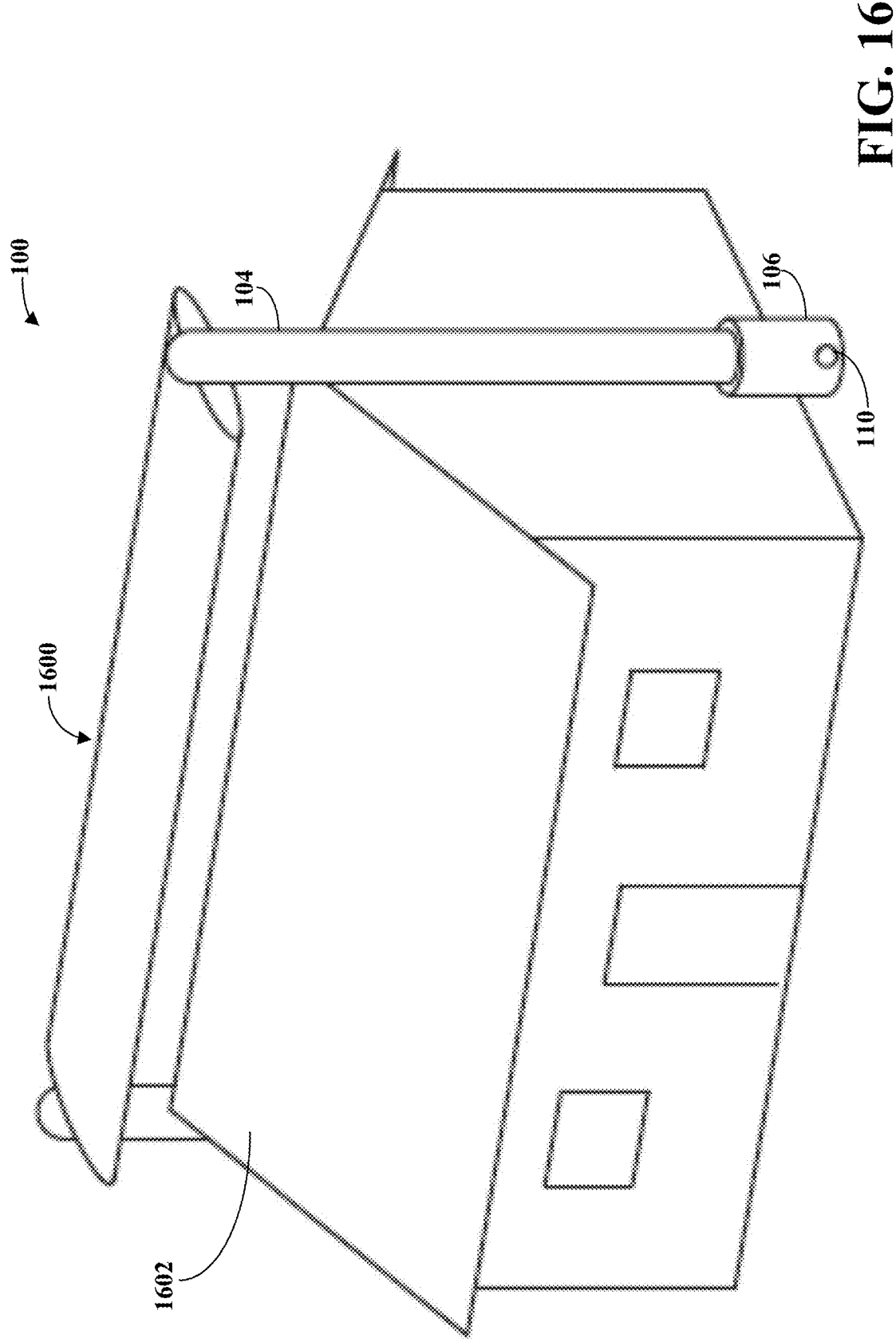
FIG. 16 illustrates a yet further exemplary energy extraction apparatus.

In a yet further embodiment, illustrated in FIG. 16, a corridor is created between an assembly 1600 and a nonadjustable surface acting as the second assembly. In the illustrated embodiment, the nonadjustable surface comprises a roof 1602 of a house and the assembly 1600 can be positioned parallel to the roof 1602. The nonadjustable surface can comprise any desired surface including a building wall, exterior of a vehicle, or the like. Further, the assembly 1600 can be positioned in any suitable arrangement with respect to the nonadjustable surface. For instance, in the illustrated embodiment, the assembly 1600 is located at the peak of the roof. In another embodiment, the assembly 1600 is located at a portion of the roof other than the peak.

In the illustrated embodiment, the channel 104 may extend along a side of the house with an inlet at a base of the house. The energy extraction device 106 may be placed near the inlet of the channel 104 as illustrated to make repair easier, however the energy extraction device 106 can be placed anywhere along the apparatus 100. For instance, the energy extraction device 106 can be located in the channel 104 adjacent the assembly 106, within the housing structure, or in a section of the channel 104 extending along a wall of the housing structure.

In yet another example, the suction effect at the inlet of the channel caused by lowering the pressure in the plenum may be used as part of a pumping system in lieu of or in addition to generating energy. For instance, the apparatus 100 may be employed without an energy extraction device 106 to be used as part of a pumping system. In another instance, the apparatus 100 may be employed as part of a pumping system and may include an energy extraction device 106 to extract energy as the fluid pump throughs the apparatus 100, as described above. In one example, the apparatus 100 can be used as part of an air conditioning system to pump air from one location, namely the inlet 110 of the channel 104, to a second location. In another example, the apparatus may be placed on an ocean, lake, or river floor and may be used to pump water from an inlet 110 of the channel 104 to a second location.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for energy extraction from fluid flow comprising:
    an assembly comprising a plenum, wherein the assembly further comprises an aperture extending from an exterior surface of the assembly to the plenum to allow flow therethrough;
    a channel comprising an inlet and an outlet, wherein the outlet is in fluid communication with the plenum;
    an energy extraction device,
    wherein the assembly is configured to create a pressure differential between the plenum and the inlet of the channel, wherein the pressure differential causes fluid flow from the inlet of the channel to the plenum, wherein the energy extraction device is configured to extract energy from the fluid flow; and
    a control system configured to modify the pressure differential to control the fluid flow between the inlet of the channel and the plenum based on a characteristic of an outside environment, wherein the control system is further configured to modify an interior size of at least one of the channel or the plenum to control the fluid flow between the inlet of the channel and the plenum.

2. The apparatus of claim 1, wherein the assembly is further configured to automatically move based on a direction of exterior wind.

3. The apparatus of claim 1, wherein the control system comprises a motor assembly configured to move the assembly.

4. The apparatus of claim 1, wherein the control system is additionally configured to modify a size of the aperture.

5. The apparatus of claim 1, wherein the assembly includes a plurality of apertures extending from the exterior surface to the plenum, wherein the plurality of the apertures comprises the aperture.

6. The apparatus of claim 1, wherein the energy extraction device comprises at least one of an electric generator or a hydraulic pump.

7. An apparatus for energy extraction from fluid flow comprising:
    means for causing fluid flow between an inlet of a channel and a plenum fluidly connected to an outlet of the channel;
    means for extracting energy from the fluid flow;
    means for modifying the fluid flow based on a characteristic of an exterior environment, and
    means for modifying an interior size of at least one of the channel or the plenum.

8. The apparatus of claim 1, wherein the assembly comprises:
    an assembly body, wherein the assembly body comprises an indentation; and an insert removably securable in the indentation, wherein the insert comprises the plenum, wherein an exterior surface of the insert comprises the exterior surface of the assembly.

9. The apparatus of claim 8, wherein the assembly body includes a locking tab comprising an arm extending into the indentation.

10. The apparatus of claim 9, wherein the insert includes a second locking tab configured to interact with the locking tab of the assembly body to removably secure the insert in the indentation.

11. The apparatus of claim 8, wherein the assembly further comprises:
a second insert removably securable in the indentation, wherein the second insert comprises a second plenum, wherein the second insert further comprises a second aperture extending from an exterior surface of the second insert to the second plenum to allow flow therethrough, wherein the outlet of the channel is in fluid communication with the second plenum when the second insert is removably secured in the indentation.

12. The apparatus of claim 11, wherein a cross-section of the second aperture is different from a cross-section of the aperture.

13. A method of forming an apparatus for energy extraction from fluid flow, wherein the method comprises:
forming an assembly comprising a plenum and an aperture extending from an exterior surface of the assembly to the plenum to allow flow therethrough;
attaching a channel to the assembly, wherein the channel comprises an inlet and an outlet, wherein the outlet is in fluid communication with the plenum to form a fluid flow pathway between the inlet and the plenum;
placing an energy extraction device in the fluid flow pathway; and
attaching a control system to at least one of the assembly, the channel, or the energy extraction device, wherein the control system is configured to modify a pressure differential to control fluid flow between the inlet of the channel and the plenum based on a characteristic of an outside environment, wherein the control system is further configured to modify an interior size of at least one of the channel or the plenum to control the fluid flow.

14. The method of claim 13, wherein forming the assembly comprises:
forming an assembly body, wherein the assembly body comprises an indentation; and
forming an insert removably securable in the indentation, wherein the insert comprises the plenum, wherein an exterior surface of the insert comprises the exterior surface of the assembly.

15. The method of claim 14, wherein forming the assembly body comprises forming a locking tab comprising an arm extending into the indentation, wherein forming the insert comprises forming a second locking tab configured to interact with the locking tab of the assembly body to removably secure the insert in the indentation.

16. The method of claim 14, wherein forming the assembly further comprises:
forming a second insert removably securable in the indentation, wherein the second insert comprises a second plenum, wherein the second insert further comprises a second aperture extending from an exterior surface of the second insert to the second plenum to allow flow therethrough, wherein the outlet of the channel is in fluid communication with the second plenum when the second insert is removably secured in the indentation.

17. The method of claim 16, wherein a cross-section of the second aperture is different from a cross-section of the aperture.

18. The method of claim 13, wherein the assembly is further configured to automatically move based on a direction of exterior wind.

19. The method of claim 13, wherein the control system is additionally configured to modify a size of the aperture.

20. The method of claim 13, wherein the energy extraction device comprises at least one of an electric generator or a hydraulic pump.

* * * * *